(12) United States Patent
Yamagami et al.

(10) Patent No.: US 6,229,954 B1
(45) Date of Patent: *May 8, 2001

(54) RECORDING AND/OR REPRODUCING APPARATUS

(75) Inventors: Taku Yamagami, Kanagawa-ken; Masao Suzuki, Tokyo; Yuji Sakaegi, Kanagawa-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/614,041

(22) Filed: Mar. 12, 1996

Related U.S. Application Data

(62) Division of application No. 08/210,565, filed on Mar. 18, 1994, now Pat. No. 5,535,011.

(30) Foreign Application Priority Data

Mar. 22, 1993 (JP) .................................................. 5-085166

(51) Int. Cl.[7] .............................. H04N 5/225; H04N 5/77
(52) U.S. Cl. ........................................... 386/117; 386/118
(58) Field of Search .................................... 358/335, 342, 358/341, 343, 909.1, 906; 348/207; 260/19.1, 32, 33.1; 386/117, 118, 38, 107, 46; H04N 5/225

(56) References Cited

U.S. PATENT DOCUMENTS 5,140,437 * 8/1992 Yonemitsu et al. .................. 386/111
5,153,730 * 10/1992 Navgasaki et al. ................... 358/209
5,535,011 * 7/1996 Yamagami et al. .................. 348/211

* cited by examiner

Primary Examiner—Robert Chevalier
(74) Attorney, Agent, or Firm—Robin, Blecker & Daley

(57) ABSTRACT

A recording and/or reproducing apparatus includes an optical system arranged to form an optical image, a photoelectric conversion part arranged to convert the optical imaged into an electrical signal, an A/D conversion circuit arranged to convert the electrical signal and/or an audio signal into a digital signal, a connector arranged to permit mounting and demounting a recording medium on which the digital signal obtained from the A/D conversion circuit is to be recorded, and a signal processing part for processing and converting the digital signal. The signal processing part is arranged to be mountable and demountable on and from the apparatus.

18 Claims, 8 Drawing Sheets

RECORDING AND/OR REPRODUCING APPARATUS

This application is a division, of application Ser. No. 08/210,565, filed Mar. 18, 1994 now U.S. Pat. No. 5,535,011.

BACKGROUND OF THE INVENTION

1. Field of the Invention

This invention relates to a recording and/or reproducing apparatus arranged to process, record and/or reproduce images and sounds.

2. Description of the Related Art

FIG. 8 shows in a block diagram a conventional digital electronic camera. Referring to FIG. 8, the digital electronic camera 800 is arranged to use a memory card 801 as a recording medium. The camera 800 includes a photo-taking lens 1, a diaphragm shutter 2 which is a shutter, but functions as a diaphragm as well, and a flash device 3. A CPU 4 is arranged to control mechanical and operation parts. A driving circuit 5 is arranged to drive each part of a mechanical system. An image sensor 6 is arranged to convert into an electrical signal a reflection light which comes from an object of shooting. A timing signal generating circuit (abbreviated to a TG circuit) 7 is arranged to generate a timing signal necessary for operating the image sensor 6. An image sensor driving circuit 8 is arranged to amplify the timing signal from the timing signal generating circuit 7 up to a level necessary for driving the image sensor 6. A preprocessing circuit 9 is provided with a CDS circuit for removing a noise from the output of the image sensor 6 and a nonlinear type amplifying circuit for amplifying the output of the image sensor 6 prior to an A/D (analog-to-digital) conversion process. Reference numeral 10 denotes an A/D converter and reference numeral 12 a buffer memory. A signal processing system control CPU 13 is arranged to control each part of a signal processing system. An operation display part 14 is arranged to make a display in aid of operation by showing the state of the camera. An externally-accessible operation part 15 is provided for operating the camera. A memory controller 802 is arranged to control the buffer memory 12. A digital signal processing circuit 803 is arranged to make the output of the image sensor 6 into a form suited for recording on the memory card 801. A memory card interface (I/F) 804 is arranged to connect the digital electronic camera 800 to the memory card 801. The conventional digital electronic camera 800 operates as described below with reference to FIG. 8.

With the operation part 15 operated by a camera operator, the digital electronic camera 800 enters into a state of performing a shooting action. The photo-taking lens 1 is controlled by the mechanical and operation part control CPU 4 and the mechanical system driving circuit 5 in accordance with the intention of the operator. At this time, the conditions of shooting, etc., are displayed at the display part 14 to inform the operator of the state of the camera 800. The luminance of the object of shooting is measured by a light measuring circuit which is not shown. An aperture value and a shutter speed of the diaphragm shutter 2 are then derived from the mechanical and operation part control CPU 4. The mechanical system driving circuit 5 drives the diaphragm shutter 2 on the basis of the control values thus derived from the CPU 4. Depending on the output of the light measuring circuit, a shot may be taken by flashing the flash device 3. When an exposure is effected in this manner, a reflection light from the object of shooting comes to fall upon the image sensor 6 via the photo-taking lens 1 and the diaphragm shutter 2. The diaphragm shutter 2 then acts to limit the quantity of the incident light upon the image sensor 6. If the image sensor 6 is an interlaced reading type CCD, the diaphragm shutter 2 is arranged to prevent an electric charge signal from being affected by the incident light. The image sensor 6 is arranged to be operated by a driving signal which is outputted from the TG circuit 7 and is amplified by the image sensor driving circuit 8. The action of the TG circuit 7 is controlled by the signal processing system control CPU 13. The output of the image sensor 6 which is driven in this manner is supplied to the preprocessing circuit 9. Upon receipt of the output of the image sensor 6, the preprocessing circuit 9 performs a CDS (correlated double sampling) process to remove a low band noise from the output of the image sensor 6 (or a pickup image signal) and a process of making the pickup image signal into a nonlinear state for the effective use of the dynamic range of the A/D converter 10. The pickup image signal thus preprocessed is converted into a digital signal by the A/D converter 10. The digital signal thus obtained is inputted to the memory controller 802. Under the control of the signal processing system control CPU 13, the memory controller 802 at first temporarily stores the digitized pickup image signal in the buffer memory 12 and then reads out the stored digital signal in order as determined by the arrangement of color filters of the image sensor 6. The digital signal thus read out is converted into a signal of a predetermined format by the digital signal processing circuit 803. The signal thus processed is recorded on the memory card 801 through the memory card interface (I/F) 804.

The conventional digital electronic camera described above, however, has the following problems.

(i) The functions of the camera are limited to picking up and recording still images and permit neither taking any motion picture nor combining with sound data.

(ii) The camera has a limited data compressing method for efficient recording on the recording medium and does not permit adoption of any other method.

(iii) It is difficult to combine the camera with an image pickup device and a sound input/output device into a highly advanced information processing apparatus having effective functions including, for example, OCR (optical character recognition), voice recognition, voice synthesis, translation, image recognition, image synthesis, etc.

Any attempt to overcome these problems, on the other hand, would necessitate incorporation of all these processing functions into the apparatus. Such an attempt, therefore, increases not only the size of the apparatus but also its price and would become a great demerit of the apparatus for a person not requiring such functions.

SUMMARY OF THE INVENTION

This invention is directed to the solution of the problems mentioned above. It is an object of this invention to provide a recording and/or reproducing apparatus which comprises an optical system arranged to form an optical image, photo-electric conversion means for converting the optical image formed by the optical system into an electrical signal, A/D conversion means for converting the electrical signal and/or an audio signal into a digital signal, a connector arranged to permit mounting and demounting a recording medium on which the digital signal obtained from the A/D conversion means is to be recorded, and signal processing means for processing and converting the digital signal, the signal processing means being arranged to be mountable and demountable on and from the recording and/or reproducing apparatus.

The apparatus arranged in accordance with this invention as an embodiment thereof is arranged to permit mounting and demounting not only the recording medium but also a part of a digital electronic camera having some specific function, such as a signal processing part, so that the size and the price of the digital electronic camera which is a basic part of the recording and/or reproducing apparatus can be minimized and the functions and the performance of the apparatus having the camera as its basic part can be altered as desired.

The above and other objects and features of this invention will become apparent from the following detailed description of embodiments thereof taken in conjunction with the accompanying drawings.

DETAILED DESCRIPTION OF THE PREFERRED EMBODIMENTS

First Embodiment

A digital electronic camera according to this invention is provided with an interface for a recording medium, a signal processing and compressing part and an extended card interface having an external interface.

The digital electronic camera according to this invention performs a minimum range of functions as a digital electronic camera when the extended card is not mounted on the camera. With the extended card mounted, however, the image and sound signal processing capability of the digital electronic camera is greatly enhanced and also the camera gains access to an external interface, so that a highly advanced system can be formed.

Figure 1:
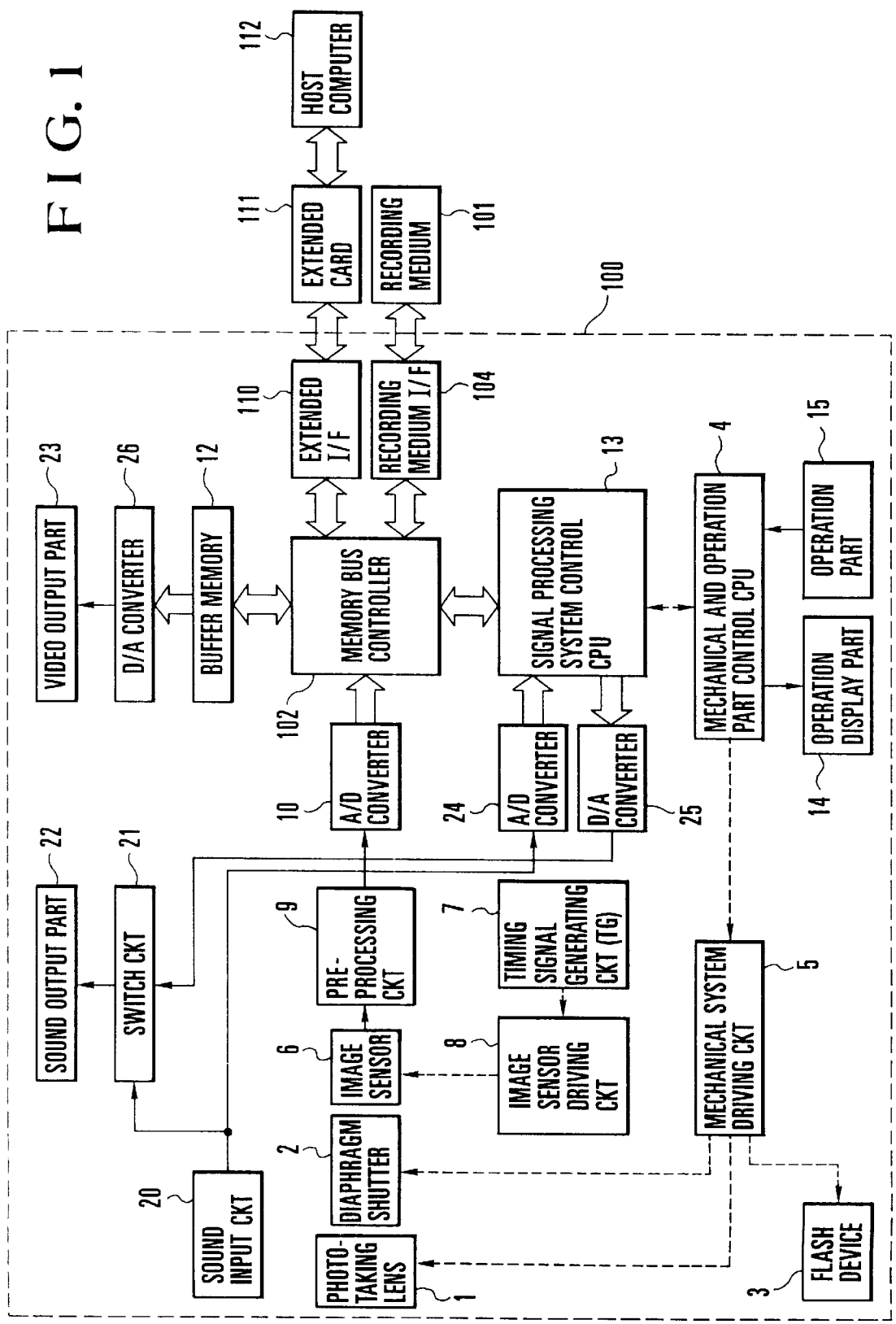
FIG. 1 is a block diagram showing the arrangement of a first embodiment of this invention.
Figure 2:
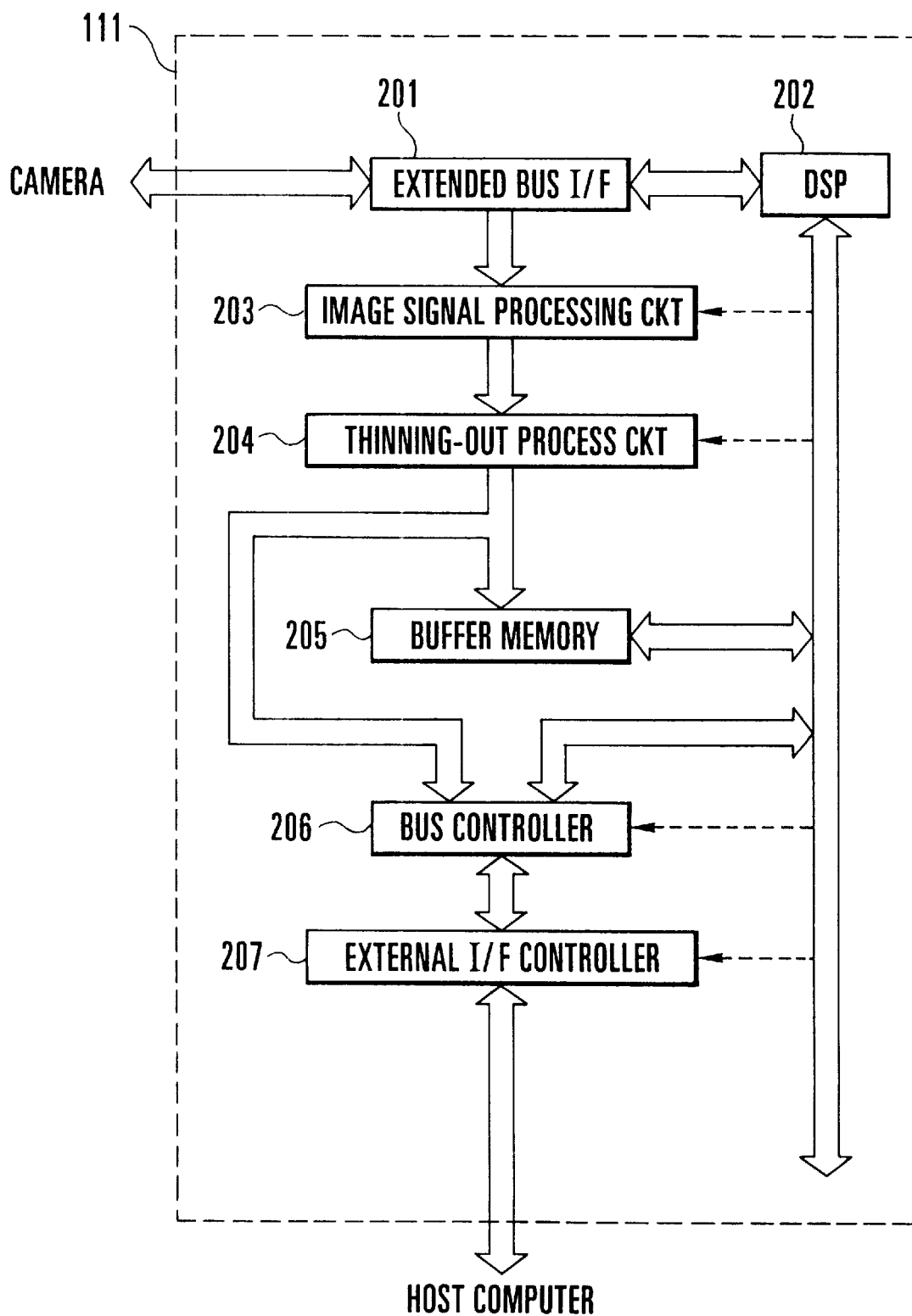
FIG. 2 is a block diagram showing the arrangement of an extended card included in FIG. 1.
Figure 8:
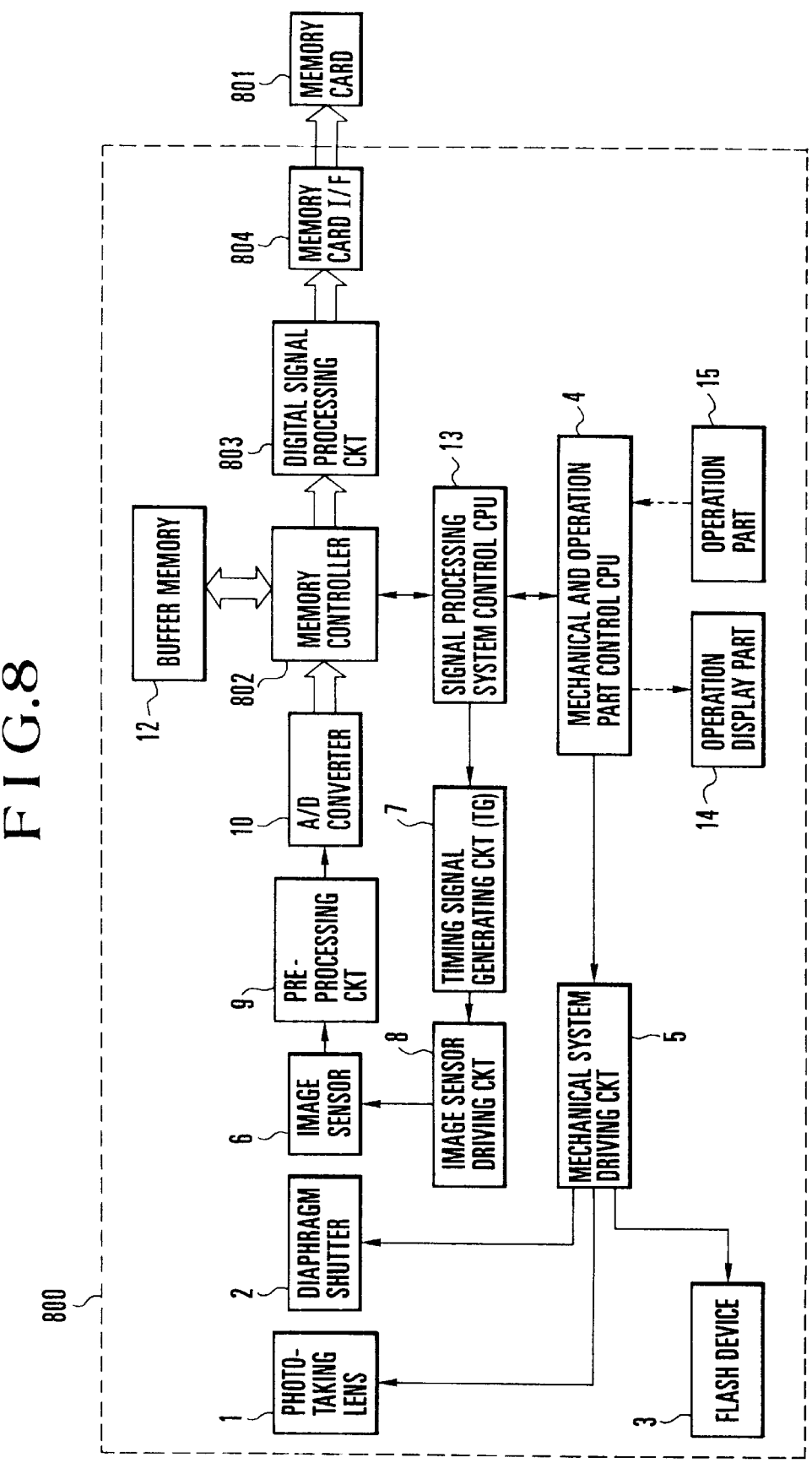
FIG. 8 is a block diagram showing the arrangement of the conventional apparatus.

FIG. 1 shows in a block diagram the arrangement of a system consisting of the digital electronic camera body and the extended card. FIG. 2 shows in a block diagram the arrangement of the extended card. In FIG. 1, all elements that function in the same manner as those of the conventional apparatus which is shown in FIG. 8 and described in the foregoing are indicated by the same reference numerals as in FIG. 8.

Referring to FIG. 1, a recording medium 101 is a memory card or a hard disk which conforms with the specifications of PCMCIA (Personal Computer Memory Card International Association), or the like. The camera body 100 includes a sound input circuit 20 and a sound output part 22 which is either a speaker or an audio jack. An A/D (analog-to-digital) converter 24 is provided for an audio signal and a D/A (digital-to-analog) converter 25 for the audio signal. A switch circuit 21 is provided for the audio signal to be supplied to the sound output part 22. A memory bus controller 102 is provided for transfer of image and sound data between a signal processing system control CPU 13 and an extended card 111 of the PCMCIA Standards or a recording medium 101 and also for transfer of image data to a buffer memory 12 for an image display.

A D/A converter 26 is arranged to convert the image data of the image display buffer memory 12 into an analog video signal. A video output part 23 is provided for displaying the analog video signal. An extended bus interface (I/F) 110 is arranged between the extended card 111 and the camera body 100.

Referring to FIG. 2, a controller extended bus interface) 201 is provided for the transfer of digital data on the extended card interface. A digital signal processor (DSP) 202 (hereinafter referred to as signal processing DSP) is arranged to communicate with a host computer 112 through a compressing/expanding process and an external interface. A pickup image signal processing circuit 203 is arranged to perform a pickup image signal processing action on unprocessed image data. A thinning-out process circuit 204 is provided for thinning out the signal processed by the pickup image signal processing circuit 203 in the vertical and horizontal spatial directions and for reducing the number of images per unit time. A buffer memory 205 is arranged to temporarily hold uncompressed image data. A bus controller 206 is arranged to control transfer of data between the thinning-out process circuit 204, the signal processing DSP 202 and an external interface (I/F) controller 207. The external I/F controller 207 is, for example, an SCSI controller which controls communication with an external interface.

The extended bus interfaces 110 and 201 will be hereinafter called the extended bus interface.

The following describes in detail how each of the functions of the embodiment is executed when (1) the extended card is not mounted and when (2) the extended card is mounted.

(1) When the extended card is not mounted: The signal processing system control CPU 13 performs control over the whole camera, filing and a display of image data and filing and reproduction of sound data. The details of the manner in which these functions are actually carried out are described as follows:

(1-1) Monitoring of images to be recorded in an image recording mode: When an instruction given by the operator for a shift to the recording mode through the operation part 15 is detected by the mechanical and operation part control CPU 4, the signal processing system control CPU 13 makes a display of a recording image through the following process.

The signal processing system control CPU 13 sets the memory bus controller 102 into a mode of writing the data outputted from the A/D converter 10 into the image display buffer memory 12. Image data which has not been subjected to the pickup image signal processing action is converted into digital data by the A/D converter 10 and is then written into the image display buffer memory 12 by the memory bus controller 102. The digital data thus written in the image display buffer memory 12 is converted into an analog video signal by the D/A converter 26. The analog video signal is sent to the video output part 23 to be displayed there in a state which enables the operator to visually confirm the recording image as a motion image. The image display buffer memory 12 which is provided only for a simple display of images does not have many picture elements and displays no color information.

Since the display is to be made by using the image data which has not been subjected to the pickup image signal processing action, the memory bus controller 102 is arranged either to extract some picture element data which corresponds to one color, green for example, to use it as a luminance image or to compute and obtain a luminance image from information on a plurality of colors by a simple filter computing operation. A motion image obtained from the image sensor 6 through the above-stated process is displayed at the video output-part 23.

(1-2) Image recording: When the mechanical and operation part control CPU 4 detects an instruction given by the operator through the operation part 15 for shooting and recording, the signal processing system control CPU 13 controls the memory bus controller 102 to cause image data which has not been subjected to the pickup image signal processing action to be recorded on the recording medium 101 through the recording medium I/F (interface) 104. A file structure of MS-DOS (Microsoft Disk Operating System) may be employed as a recording file format for this. During the period of image data transfer for recording and a predetermined period of time ensuing the recording, the image being recorded can be held still at the video output part 23 if the memory bus controller 102 gives pause to writing into the image display buffer memory 12, so that a still image currently recorded can be confirmed at the video output part 23 by the operator during that period.

(1-3) Monitoring and recording of sounds in recording the sounds: In the recording mode, the signal processing system control CPU 13 permits monitoring the sounds to be recorded by operating the switch circuit 21 to connect the output of the sound input circuit 21 to the sound output part 22.

When the mechanical and operation part control CPU 4 detects an instruction given by the operator through the operation part 15 for sound recording, the signal processing system control CPU 13 receives the sound data converted into digital data by the A/D converter 24 and transfers the digital sound data to the recording medium interface 104 through the memory bus controller 102. The recording file format may be of a file structure such as that of the MS-DOS.

When the mechanical and operation part control CPU 4 detects the cancellation of the sound recording instruction by the operator through the operation part 15, or when the signal processing system control CPU 13 considers that the sound recording is canceled by the lapse of a predetermined period of time, the process of sound recording is brought to an end by the signal processing system control CPU 13.

(1-4) Simultaneous recording of images and sounds: In recording images and sounds simultaneously, the signal processing system control CPU 13 holds sound data received from the A/D converter 24 within an internal buffer of the signal processing system control CPU 13 for a period of time during which the images are transferred to the recording medium interface 104. When the image transfer period expires, the sound data is transferred to the recording medium interface 104. One field period of the NTSC system, which is 16.7 msec, includes a period of about 1.4 msec called a vertical blanking period, during which no video signal appears beginning before and ending after a vertical synchronizing period. In a case where image data is to be transferred at an ordinary video rate, the image data which has not been subjected to the pickup image signal processing action is transferred during a period of about 15 msec excluding this vertical blanking period. For this purpose, the data is transferred at a speed rate of about 10 Mbyte/sec.

In sampling the sound data at a frequency of 22 KHz with one sample consisting of 8 bits, the data capacity for 16.7 msec is about 370 bytes. In a case where the data is to be transferred in remaining 1.4 msec, the transfer must be made at a speed of about 260 Kbyte/sec.

These requirements for the transfer speed can be satisfied by using as the recording medium, for example, a memory card which conforms to the specifications of the PCMCIA or the like.

As described above, in the case of the digital electronic camera of this embodiment, the sound data is transferred during the vertical blanking period and the image data during the video period within the period of one picture in a time-division multiplexing manner. Recording thus can be accomplished while simultaneously monitoring both the images and the sounds.

In this instance, since the sound data can be regarded as information related to the images, the images and the sounds can be filed and managed in pairs.

Further, the sound data may be transferred within a horizontal blanking period of the video signal instead of the vertical blanking period. In a case where the sound is sampled at 44.1 KHz, stereophonic and 8 bits, the sound data of a total of 6 bytes or 4 bytes is transferred and recorded within one horizontal blanking period. In this case, if a hard disk drive (HDD) or the like having a mechanical structure is employed as the recording medium, the recording is preferably performed in such a way as to interleave the sound data for every horizontal scanning period. However, in the event of a semiconductor memory, it is not necessary to interleave the image and sound data for every horizontal scanning period. In that event, interleave recording may be performed for every vertical scanning period in such a way as to have the sound data recorded before the image data of one vertical scanning period.

(1-5) Reproduction of images: When the mechanical and operation part control CPU 4 detects an instruction given by the operator through the operation part 15 for a shift to a reproduction mode, the signal processing system control CPU 13 performs the following process for reproducing and displaying the recording image at the video output part 23.

The signal processing system control CPU 13 controls the recording medium interface 104 and the memory bus controller 102 to read out, from the recording medium 101, image data which has not been subjected to the pickup image signal processing action in the same manner as the process of monitoring the recording image as mentioned for the function or Para. (1-1) above. Luminance information is formed by this process and the image data thus read out is written in the image display buffer memory 12. In this instance, if a plurality of sound data have been managed relative to the image, the sound data can be reproduced by the process of a next function described in the following paragraph, or function, (1-6).

(1-6) Reproduction of sounds: When the mechanical and operation part control CPU 4 detects an instruction given by the operator through the operation part 15 for reproduction of sounds, the signal processing system control CPU 13 performs the following process to reproduce the recorded sounds at the sound output part 22.

The signal processing system control CPU 13 controls the switch circuit 21 to have the output of the D/A converter 25 connected to the input of the sound output part 22. The signal processing system control CPU 13 then controls the recording medium interface 104 and the memory bus controller 102 to read out the sound data from the recording medium 101. The sound data is outputted to the D/A converter 25 at the same sampling frequency as the sampling frequency of recording. The sound output part 22 then outputs the sounds.

(1-7) Imparting sounds to reproduced images: With images reproduced by the function (1-5) "Reproduction of images" and sounds recorded by the function (1-3) "Monitoring and recording of sounds in recording the sounds", the operator can add sounds and voices describing the images while watching the recorded images at the video output part 23. In this instance, the sound data is managed and arranged as sound data relative to the reproduced images. A plurality of sound data can be thus added to the images.

(1-8) Reproduction of a plurality of images: When the mechanical and operation part control CPU 4 detects an instruction given by the operator through the operation part 15 for a mode of reproducing a plurality of images, the signal processing system control CPU 13 causes a plurality of recorded images to be reproduced and displayed at the video output part 23 by carrying out the following process.

Figure 3:
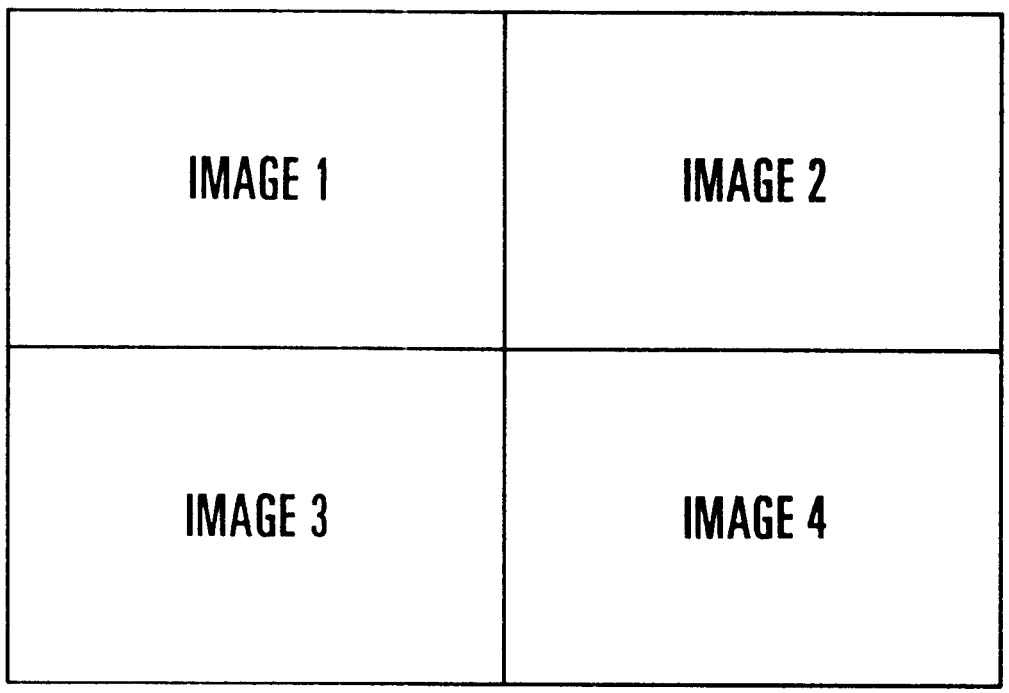
FIG. 3 shows a picture dividing action to be performed by the first embodiment.

Image data is read out from the recording medium 101 in the same manner as in the function (1-5) "Reproduction of images". The memory bus controller 102 thins out luminance information finally obtained and transfers it to the image display buffer memory 12. This process is carried out for a plurality of images. As a result, a multiple picture can be displayed, for example, in a manner as shown in FIG. 3. In the case of FIG. 3, the luminance information is thinned out by half in each of the vertical and horizontal directions of the picture.

(2) When the extended card is mounted: The extended card functions to perform a pickup image signal processing action and compressing and expanding processes on images and to perform compressing and expanding processes on sounds. The extended card also allows the camera to have access to an external interface as well as to the recording medium interface 104.

Therefore, the pickup image signal processing action and the compressing and expanding processes can be carried out on the signal obtained from the image sensor 6. The form of data on the recording medium thus can be changed. The data on the recording medium can be transferred to an external interface after the form of the data is converted into another form as necessary. Data from an external interface can be received and its form can be changed before recording it on the recording medium or returning it to the external interface.

The function of "monitoring recording images in the image recording mode" is carried out in the same manner as when the extended card is not mounted. Other functions are carried out as described in detail below.

(2-1) Image recording: When the mechanical and operation part control CPU 4 detects an instruction given by the operator through the operation part 15 for shooting and recording, the signal processing system control CPU 13 informs the signal processing DSP 202 of commencement of image recording and controls the memory bus controller 102 to have image data which has not been subjected to the pickup image signal processing action transferred to the extended bus interface via the recording medium interface 104. Upon receipt of the notice of commencement of image recording, the signal processing DSP 202 initializes the pickup image signal processing circuit 203 and the thinning-out process circuit 204 to ready them for receiving unprocessed image data from the extended bus interface.

The image data is processed by the pickup image signal processing circuit 203 to be converted into luminance information and color information. The output of the pickup image signal processing circuit 203 is either thinned out or not thinned out by the thinning-out process circuit 204 according to the recording mode. The information is then transferred to the buffer memory 205. After the luminance and color information is completely transferred to the buffer memory 205, the thinning-out process circuit 204 informs the signal processing DSP 202 of the completion of the transfer of the image data.

Upon receipt of the notice of completion of image data transfer, the signal processing DSP 202 compresses the data on the buffer memory 205 and controls the extended bus interface, the memory bus controller 102 and the recording medium interface 104 to have the data recorded on the recording medium 101.

To permit quicker confirmation of the contents of the image recorded after shooting, the signal processing DSP 202 is capable of adding a thinned-out image of the compressed image to the file of compressed data. With the image assumed to be thinned down to ⅛ or thereabout of its original state longitudinally and transversely, for example, the addition of the thinned-down image does not cause any excessive increase in the file capacity. An image obtained in this manner is called an index image.

(2-2) Monitoring and recording of sounds in recording the sounds: Sounds are monitored in the same manner as in the function (1-3) described in the foregoing. When the mechanical and operation part control CPU 4 detects an instruction given by the operator through the operation part 15 for sound recording, the signal processing system control CPU 13 notifies the signal processing DSP 202 of commencement of sound recording. The signal processing system control CPU 13 receives digital data which is obtained through conversion by the A/D converter 24. The digital data is transferred to the extended bus interface through the memory bus controller 102.

The signal processing DSP 202 receives the data from the extended bus interface and compresses it. The compressed data is recorded on the recording medium 101 through the extended bus interface, the memory bus controller 102 and the recording medium interface 104. This action is performed during one sampling period of the sound data.

When the mechanical and operation part control CPU 4 detects an instruction given by the operator through the operation part 15 to cancel the sound recording instruction, the signal processing system control CPU 13 notifies the signal processing DSP 202 of termination of the sound recording. This arrangement may be changed to cause the signal processing DSP 202 to terminate the sound recording by considering the sound recording instruction to be canceled when a predetermined period of time lapses and to notify the signal processing system control CPU 13 of the termination of the sound recording.

(2-3) Simultaneous recording of images and sounds: When the mechanical and operation part control CPU 4 detects an instruction given by the operator through the operation part 15 for shooting and recording, the signal processing system control CPU 13 notifies the signal processing DSP 202 of commencement of recording of images and that the image recording is accompanied by recording of sounds.

The conversion of unprocessed image data into uncompressed image data and the transfer of it to the buffer memory 205 are carried out in the same manner as in the function (2-1) described above. In this case, however, the signal processing DSP 202 does not begin to perform image compressing and recording actions until it is notified of termination of sound recording from the signal processing system control CPU 13.

The signal processing system control CPU 13 controls the memory bus controller 102 in such a manner that the image data is transferred to the extended bus interface, instead of transferring it to the recording medium interface, unlike the function (1-4) "simultaneous recording of images and sounds". In this case, the signal processing system control CPU 13 performs buffering and filing processes on the sound data by time-division multiplexing in synchronism with the image transfer by the memory bus controller 102 in the same manner as the function (1-4). Upon completion of filing the uncompressed sound data, the signal processing system control CPU 13 notifies the signal processing DSP 202 of completion of the sound recording.

Upon receipt of the notice of completion of the sound recording from the signal processing system control CPU 13, the signal processing DSP 202 performs image compressing and recording actions in the same manner as in the case of the function (2-1). Further, the DSP 202 reads out the uncompressed sound data recorded by the signal processing system control CPU 13 by controlling the recording medium interface 104, the memory bus controller 102 and the extended bus interface and compresses it by transferring it to the buffer memory 205 to an amount allowable by the capacity thereof. After compression, the sound data is recorded on the recording medium 101 through the extended bus interface and the memory bus controller 102. This action is repeated until all the uncompressed sound data is compressed. Upon completion of compression, the signal processing system control CPU 13 erases the file of recorded uncompressed sound data from the buffer memory 205.

(2-4) Transfer of motion image data and sound data to the external interface: The host computer 112 issues an instruction to the camera of this embodiment through the external interface for transfer of motion image data and sound data to the host computer 112. The signal processing DSP 202 then sets a mode for the memory bus controller 102 in such a way as to have the output data of the A/D converter 10 always written into the image display buffer memory 12 to enable the operator to monitor images at the video output part 23 and, at the same time, to have the output data of the A/D converter 10 supplied to the extended bus interface.

(2-4-1) Transfer of image data: The signal processing DSP 202 controls the pickup image signal processing circuit 203 and the thinning-out process circuit 204 in such a way as to receive unprocessed image data from the extended bus interface. The signal processing DSP 202 controls the bus controller 206 to have the image data transferred from the thinning-out process circuit 204 to the external interface controller 207 and also sets a mode for the external interface controller 207 to receive data from the bus controller 206 and to transfer it to an external bus.

Unprocessed image data is processed into luminance information and color information by the pickup image signal processing circuit 203. The output of the pickup image signal processing circuit 203 is thinned out as necessary by the thinning-out process circuit 204 and then is transferred to the external interface controller 207. The thinning-out process circuit 204 is arranged to notify the signal processing DSP 202 of completion of the transfer of the luminance and color information to the external interface controller 207 upon completion of the transfer for one picture. The signal processing DSP 202 then notifies the signal processing system control CPU 13 of completion of the transfer of the image data.

The signal processing system control CPU 13 holds the sound data received from the A/D converter 24 in its internal buffer during the period of transfer of the image data to the external interface controller 207. This period is about 15 msec as mentioned in the foregoing with respect to the function (1-4). A buffer capacity for buffering is about 370 bytes.

(2-4-2) Transfer of sound data: Upon receipt of the notice of completion of image data transfer, the signal processing system control CPU 13 allows the sound data held in the internal buffer during the period of transfer of image data to be transferred to the signal processing DSP 202 through the memory bus controller 102 and the extended bus interface. During the period of the transfer of the sound data also, the signal processing system control CPU 13 holds the data received from the A/D converter 24 in the internal buffer thereof.

When the notice of completion of the transfer of image data is received, the signal processing DSP 202 changes the bus controller 206 from one state over to another in such a way as to allow the sound data received from the signal processing system control CPU 13 to be transferred to the external interface controller 207.

After completion of the above-stated transfer, the function (2-4-1) is performed on the signal of a next video field. With the functions (2-4-1) and (2-4-2) alternately repeated, the image data and sound data are transferred in a state of being time-division multiplexed with each other. This action continues until some instruction for termination is received from the external interface. For example, in a case where an SCSI (Small Computer System Interface) is employed, the instruction for termination may be obtained with an attention condition generated by the host computer 112.

In order to carry out the above-stated transfer without difficulty, the speed of transfer to the external interface must be higher than the maximum speed of data generation. In the event of an insufficient speed of transfer to the external interface, the insufficiency can be offset and covered by thinning out the data through the thinning-out process circuit 204. In such a case, either the image data is spatially thinned or the number of images is thinned (reduced) or both of these thinning methods may be employed. In the case of thinning the number of images, however, the signal processing system control CPU 13 must have a large buffer capacity for buffering the sound data. Therefore, this is a matter of trade-off.

While images and sounds are transferred at the same time in the description given above, the operation of the embodiment in transferring only images or sounds is self-explanatory from the description given above.

(2-5) Reproduction of image data on the recording medium by the camera: When the mechanical and operation part control CPU 4 detects an instruction given by the operator through the operation part 15 for a shift to the reproduction mode, the signal processing system control CPU 13 notifies the signal processing DSP 202 of the instruction for reproduction of images.

(2-5-1) Reproduction of unprocessed images on the recording medium: If an image file recorded on the recording medium 101 consists of unprocessed image data, the signal processing DSP 202 controls the recording medium interface 104, the memory bus controller 102 and the extended bus interface to read the image data from the recording medium 101. The image data is supplied to the pickup image signal processing circuit 203.

The image data is processed by the pickup image signal processing circuit 203 into luminance and color information. The output of the pickup image signal processing circuit 203 is thinned, if necessary according to the image size of the image display buffer memory 12, by the thinning-out process circuit 204 and is transferred to the buffer memory 205. After completion of transfer of the luminance and color information to the buffer memory 205, the thinning-out process circuit 204 notifies the signal processing DSP 202 of completion of the transfer. Upon receipt of this notice, the signal processing DSP 202 transfers the luminance information data of the buffer memory 205 to the image display buffer memory 12 by controlling the extended bus interface and the memory bus controller 102.

(2-5-2) Reproduction of compressed images on the recording medium: In a case where an image file recorded on the recording medium consists of compressed image data, the signal processing DSP 202 reads out the compressed image data from the recording medium 101 by controlling the recording medium interface 104, the memory bus controller 102 and the extended bus interface. The data of luminance information is expanded and thinned if necessary according to the image size of the image display buffer memory 12. The image data is then transferred to the image display buffer memory 12 through the extended bus interface and the memory bus controller 102.

In a case where an index image is added, the expanding process is not necessary. In that case, the image data is thinned or interpolated, or left as it is according to the image size of the image display buffer memory 12 and, after that, is transferred to the image display buffer memory 12 through the extended bus interface and the memory bus controller 102.

(2-6) Reproduction of sound data on the recording medium by the camera: When the mechanical and operation part control CPU 4 detects an instruction given by the operator through the operation part 15 for reproduction of sounds, the signal processing system control CPU 13 notifies the signal processing DSP 202 of the instruction for reproduction of sounds.

Upon receipt of the notice, the signal processing system control CPU 13 controls the switch circuit 21 to select the output of the D/A converter 25.

The signal processing DSP 202 controls the recording medium interface 104, the memory bus controller 102 and the extended bus interface to read out the sound data. If the sound file consists of uncompressed sound data, the sound data read out is transferred as it is to the signal processing system control CPU 13. If the sound file consists of compressed sound data, the sound data is expanded before it is transferred to the signal processing system control CPU 13. The signal processing system control CPU 13 then outputs and supplies the sound data received to the D/A converter 25 at the same frequency as the sampling frequency employed at the time of recording.

(2-7) Transfer of image data on the recording medium to the external interface: The host computer 112 instructs via the external interface the camera of this embodiment to transfer image data recorded on the recording medium 101 to the host computer 112.

Assuming that the recording medium 101 has an unprocressed image file and a compressed image file recorded thereon, images transferable to the host computer 112 are assumed to be in the forms of unprocessed images, compressed images and uncompressed images.

If an unprocessed image and a compressed image are to be transferred as they are to the host computer 112 from the recording medium 101, the signal processing DSP 202 reads out the image data from the recording medium 101 by controlling the recording medium interface 104, the memory bus controller 102 and the extended bus interface, and transfers the image data to the bus controller 206 and the external interface controller 207.

In a case where an unprocessed image is to be transferred after converting it into an uncompressed image, the signal processing DSP 202 causes the pickup image signal processing circuit 203 to process the unprocessed image data into uncompressed image data and transfers it to the bus controller 206 and the external interface controller 207, in the same manner as in the case of the function (2-4-1) described in the foregoing.

If an unprocessed image is to be transferred after converting it into a compressed image, the signal processing DSP 202 causes the unprocessed image data to be processed into uncompressed image data by the pickup image signal processing circuit 203 and to be transferred to the buffer memory 205, in the same manner as the function (2-4-1). The signal processing DSP 202 then compresses the uncompressed image data and transfers the compressed image data to the bus controller 206 and the external interface controller 207.

If a compressed image is to be transferred after converting it into an uncompressed image, the signal processing DSP 202 expands the compressed image data and, after that, transfers it to the external interface controller 207, in the same manner as in the case of the function (2-4-2) described in the foregoing.

(2-8) Transfer of sound data on the recording medium to the external interface: The host computer 112 instructs the camera of this embodiment through the external interface to transfer the sound data on the recording medium 101 to the host computer 112.

The recording medium 101 is assumed to have an uncompressed or compressed sound file recorded thereon. Sounds are assumed to be transferred to the host computer 112 in the form of uncompressed or compressed sounds.

In a case where uncompressed sound data and compressed sound data are to be transferred from the recording medium 101 as they are, the signal processing DSP 202 reads the sound data out from the recording medium 101 by controlling the recording medium interface 104, the memory bus controller 102 and the extended bus interface and transfers the sound data to the bus controller 206 and the external interface controller 207.

If the form of data is to be converted, the signal processing DSP 202 reads out the sound data by controlling the recording medium interface 104, the memory bus controller 102 and the extended bus interface. In converting uncompressed sound data into compressed sound data, the signal processing DSP 202 compresses the data and supplies it to the bus controller 206 and the external interface controller 207. In converting compressed sound data into uncompressed sound data, the signal processing DSP 202 expands the data and supplies it to the bus controller 206 and the external interface controller 207.

(2-9) Transfer of image data of the host computer onto the recording medium: The host computer 112 issues an instruction to the camera of this embodiment through the external interface and image data is transferred from the host computer 112 to the camera to have it recorded on the recording medium 101. The image data to be transferred from the host computer 112 is in the form of an unprocessed image, a compressed image or an uncompressed image. As for the form in which the image data is to be recorded on the recording medium 101, the image data is in the form of a compressed image.

In a case where the form of data is not to be converted, the signal processing DSP 202 receives the image data from the external interface controller 207 and records it on the recording medium 101 by controlling the extended bus interface, the memory bus controller 102 and the recording medium interface 104.

If the form of data is to be converted, the signal processing DSP 202 receives unprocessed image data from the external interface controller 207 and transfers the data to the image pickup signal processing circuit 203 to form uncompressed image data at the buffer memory 205. After that, the signal processing DSP 202 compresses the image data and records the compressed image data on the recording medium 101. In some other case, the signal processing DSP 202 receives uncompressed data and records it on the recording medium 101 by compressing it.

(2-10) Conversion of the form of data of the host computer: The host computer 112 instructs the camera of this embodiment through the external interface to convert the form of the data transferred from the host computer and, after conversion, to return the data to the external interface. The forms of the image data to be transferred from the host computer 112 include an unprocessed image, a compressed image and an uncompressed image. The image data to be returned is in the form of a compressed image or an uncompressed image.

The sound data to be transferred from and returned to the host computer 112 is in the form of compressed sounds or uncompressed sounds.

In a case where the form of an unprocessed image is to be converted, the signal processing DSP 202 receives the unprocessed image data through the external interface controller 207 and the bus controller 206. The data thus received is transferred to the pickup image processing circuit 203 to form uncompressed data at the buffer memory 205. After that, the uncompressed data formed at the buffer memory 205 is returned to the host computer 112 through the bus controller 206 and the external interface controller 207 either as it is or after compressing it.

In a case where the form of a compressed image is to be converted, the signal processing DSP 202 receives the compressed image data through the external interface controller 207 and the bus controller 206 and transfers it to the buffer memory 205. After the transfer, the data of the buffer memory 205 is expanded and returned to the host computer 112 through the bus controller 206 and the external interface controller 207.

In converting the form of an uncompressed image, the signal processing DSP 202 receives the uncompressed image data through the external interface controller 207 and the bus controller 206 and transfers it to the buffer memory 205. After the transfer, the data of the buffer memory 205 is compressed and returned to the host computer 112 by controlling the bus controller 206, the external interface controller 207.

In converting the form of sounds, the signal processing DSP 202 receives the sound data through the external interface controller 207 and the bus controller 206 and transfers it to the buffer memory 205. The signal processing DSP 202 converts the form of the data of the buffer memory 205 until the sound data has been completely transferred or after an amount of the sound data corresponding to the capacity of the buffer memory 205 has been transferred. The sound data thus processed to have its form converted is returned to the host computer 112 by controlling the external interface controller 207. This process is repeated until all sound data existing at the host computer 112 is processed.

With the extended card used, this function enables the host computer 112 which has a low signal processing capability to process signals at a high speed.

Second Embodiment

Figure 4:
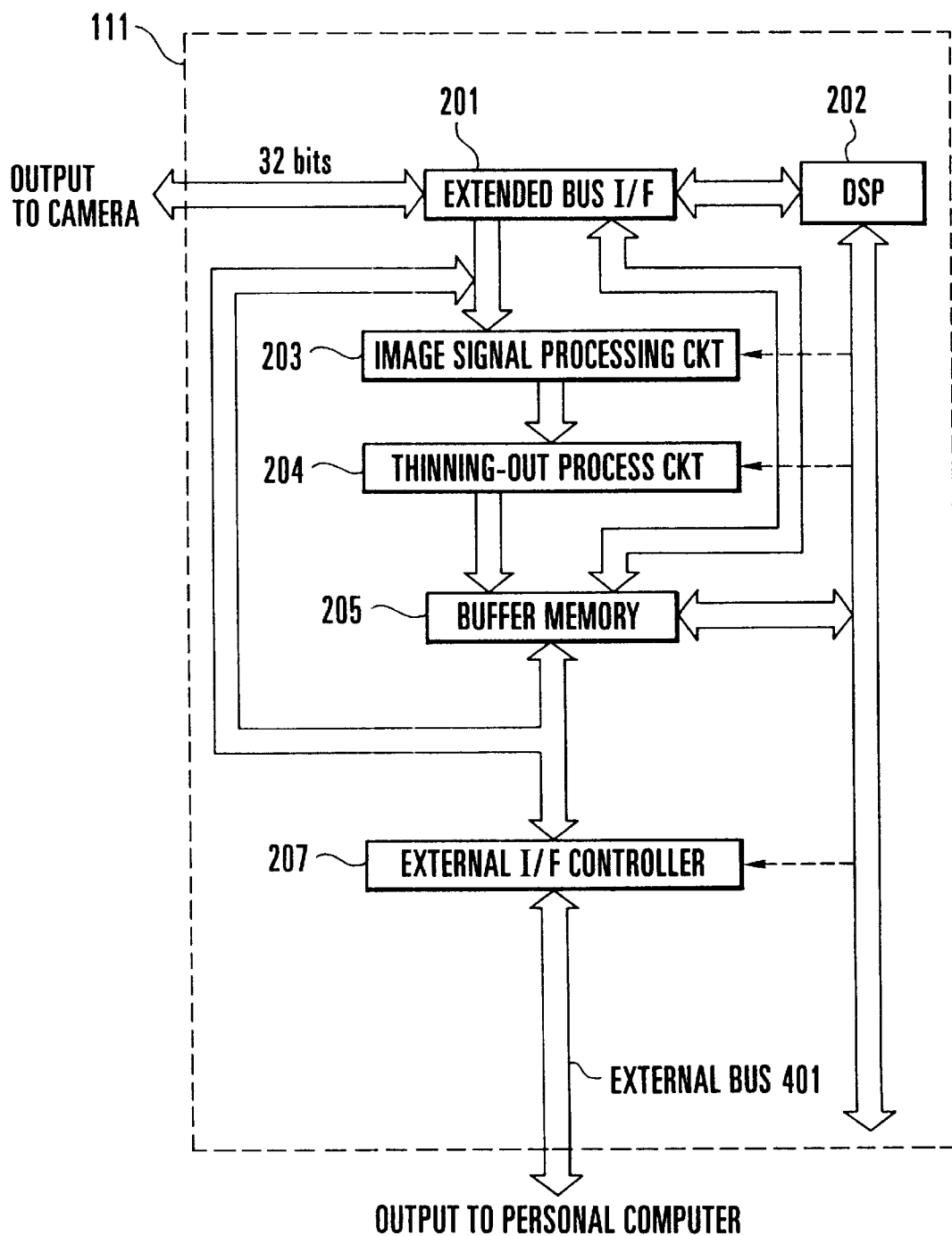
FIG. 4 is a block diagram showing an extended card arranged in a second embodiment of this invention.

FIG. 4 is a system block diagram of an extended card to be used for the digital electronic camera of a second embodiment of this invention. This embodiment differs from the first embodiment only in the internal arrangement of the extended card. Referring to FIG. 4, an extended bus interface (I/F) controller 201 is provided for the transfer of digital data on the extended card interface. A digital signal processor (hereinafter referred to as DSP) 202 is arranged to carry out compressing and expanding processes and to communicate with a host computer through an external interface. A digital pickup image signal processing circuit 203 is arranged to perform a pickup image signal processing action on unprocessed image data. A thinning-out process circuit 204 is arranged to thin out a signal which has been subjected to the pickup image signal processing action in the vertical and horizontal space directions and in respect of the number of images per unit time. A buffer memory 205 is arranged to intermediately operate for data transfer to be made between an extended bus, the thinning process circuit, the DSP and the external interface. An external interface controller 207 is, for example, an SCSI controller and is arranged to control communication with an external bus 401. The external bus 401 is arranged to connect the camera of this embodiment with the host computer.

In the case of the second embodiment, the bit width of the extended bus interface is arranged to be larger than that of the first embodiment, so that the data transfer can be made faster than the first embodiment.

When the extended card is not mounted, the second embodiment operates in exactly the same manner as the first embodiment. Therefore, the following describes the operation of the second embodiment to be performed with the extended card mounted on the camera body thereof.

(2-1) Image recording: The same as the image recording action of the first embodiment described.

(2-2) Monitoring and recording of sounds in recording the sounds: In recording sounds, the sounds are monitored in the same manner as the function (1-3) of the first embodiment. When the mechanical and operation part control CPU 4 detects an instruction given by the operator through the operation part 15 for recording sounds, the signal processing system control CPU 13 notifies the DSP 202 of commencement of sound recording. The signal processing system control CPU 13 then receives digital data obtained through the A/D converter 24 and transfers it to the extended interface 110 through the memory bus controller 102.

The DSP 202 receives the data from the extended bus interface 201 and compresses the data. After that, the compressed data is recorded on the recording medium 101 through the extended bus interface 201, the memory bus controller 102 and the recording medium interface 104. The DSP 202 is notified of termination of the sound recording by the operation part control CPU 4 through the signal processing system control CPU 13 either when cancellation of the sound recording instruction given by the operator through the operation part 15 is detected by the operation part control CPU 4 or when the lapse of a predetermined period of time prompts the CPU 4 to consider the sound recording to be canceled.

(2-3) Simultaneous recording of images and sounds: When the operation part control CPU 4 detects an instruction given by the operator through the operation part 15 for shooting and recording, the signal processing system control CPU 13 notifies the DSP 202 of commencement of image recording, indicating, in this instance, that the image recording is accompanied by sound recording.

Unprocessed image data is then converted into uncompressed image data and is transferred to the buffer memory 205 in the same manner as the function (2-1) of the first embodiment. The DSP 202 does not begin to perform image compressing and recording actions until the DSP 202 receives notice of termination of sound recording from the signal processing system control CPU 13.

The signal processing system control CPU 13 controls the memory bus controller 102 in such a way as to transfer the image data to the extended interface 110. The signal processing system control CPU 13 then transfers also sound data to the extended interface 110, in the same manner as the function (2-2) of the first embodiment. The DSP 202 receives the above-stated data from the extended bus interface 201 and compresses the data. The compressed data is recorded on the recording medium 101 through the extended interface 110, the memory bus controller 102 and the recording medium interface 104. Since the width of the bus between the camera body is wider than that of the first embodiment, the second embodiment has an ample transmission capability. Therefore, the second embodiment permits simultaneous input and output of the image data and the sound data in the manner described above.

The operation part control CPU 4 notifies the DSP 202 of termination of sound recording through the signal processing system control CPU 13 when cancellation of the instruction given by the operator through the operation part 15 for sound recording is detected or when the operation part control CPU 4 is prompted to consider the sound recording to be canceled by the lapse of a predetermined period of time. After termination of sound recording, the DSP 202 compresses uncompressed image data stored in the buffer memory 205 and records the compressed image data on the recording medium 101 through the extended bus interface 110, the memory bus controller 102 and the recording medium interface 104.

(2-4) Transfer of motion image data and sound data to the external bus: When the host computer issues an instruction through the external bus 401 to the camera of this embodiment to transfer motion image data and sound data to the host computer 112, the DSP 202 sets the memory bus controller 102 into a mode in which data outputted from the A/D converter 10 is always written into the display buffer memory 12 to enable the operator to monitor images at the video display part 23. The DSP 202 also sets a mode in which the data outputted from the A/D converter 10 is supplied to the extended interface 110.

(2-4-1) Transfer of image data: The DSP 202 initializes the pickup image signal processing circuit 203 and the thinning-out process circuit 204 to make them ready for receiving unprocessed image data from the extended bus interface 201. The unprocessed image data is processed by the pickup image signal processing circuit 203 into luminance and color information. The information is, if necessary, thinned out by the thinning-out process circuit 204 and is transferred to the external interface controller 207 through the buffer memory 205.

(2-4-2) Transfer of sound data: The memory bus controller 102 generates an interruption into the signal processing system control CPU 13 every time the transfer of one horizontal scanning amount of data comes to an end. The signal processing system control CPU 13 causes its internal buffer to store therein an audio (sound) signal sampled through the A/D converter 24 at a predetermined frequency defined by its internal timer. The buffering amount of the buffer is 4 to 6 bytes per horizontal scanning in the case where the sampling frequency is 44.1 KHz, stereophonic, and a quantizing number is 8 bits (the buffering amount is 8 to 12 bytes if the quantizing number is 16 bits). When the interruption from the memory bus controller 102 is allowed at every horizontal scanning, the signal processing system control CPU 13 transfers the 4 to 6 bytes of data stored in its internal buffer to the DSP 202 through the memory bus controller 102 and the extended interface 110. The sound data is transferred by the DSP 202 to the external interface controller 207 via the buffer memory 205.

Upon completion of this transfer, the process of the above-stated function (2-4-1) is executed on the amount of video signal of a next horizontal scanning.

With the above-stated functions (2-4-1) and (2-4-2) incessantly repeated, the image data and the sound data are transferred to the external bus 401 in a time-division multiplexing manner. This action continues until an instruction for termination is given in one way or another from the external bus. For example, if an SCSI is used, the instruction for termination is given with a condition of attention generated by the host computer.

With respect to the point that the speed of the external bus 401 must be higher than the maximum speed of data generation, the second embodiment is the same as the first embodiment. With the maximum transfer speed of the external bus assumed to be S (byte/sec), the average amount of data per image to be M (bytes), a frame rate to be F (frame/sec), the sampling frequency for sounds to be f (Hz) and the number of bytes per sound sampling to be n (bytes), there is obtained the following relation:

$$S \geq M \cdot F + f \cdot n$$

Hence, it is apparent that the frame rate is set to obtain a relation as follows: $F \leq [S-f \cdot n]/M$ It is also apparent that, as an alternative to be employed as necessary, the thinning-out process should be carried out in the spatial directions to suppress the average amount of data per image frame to obtain a relation which is expressed as follows: $M \leq [S-f \cdot n]/F$ While the operation of the second embodiment to be performed in a case where images and sounds are to be transferred at the same time has been described above, the operation of the embodiment in transferring only images or sounds is self-explanatory from the description given.

Further, the apparatus of this invention is capable of controlling mechanical, operation and operation display parts related to shooting in accordance with instructions given from the host computer 112 through the external bus 401.

An instruction coming through the external bus 401 is sent to the operation part control CPU 4 through the external interface controller 207, the extended bus interface 201, the memory bus controller 102 and the signal processing system control CPU 13. The instruction is carried out by the operation part control CPU 4 by regarding data thus received as a command. Depending on the contents of the command, data stored as internal data by the operation part control CPU 4 can be sent to the host computer 112 through a reverse route. Such data relates to, for example, obtaining the result of distance measurement, designation of focusing, obtaining a current zooming state, setting a zooming value, obtaining data of light measurement, designation of an aperture value, designation of exposure correction, obtaining the current value of exposure correction, commencement or inhibition of a process of charging a flash device, commencement or inhibition of flashing, setting flash light distribution characteristic for zooming, obtaining voltage value of a power supply disposed within the camera, finding the states of operation members of the operation part such as a release button, a zoom button, a barrier switch, a frame feeding or returning button, a shooting mode setting button, etc., and setting the contents of a display to be made at the operation display part.

Further, by varying a frequency dividing ratio and by applying it to the TG circuit 7 from a reference signal transmitter which is not shown, motion images can be obtained not only at an ordinary video frame rate (30 frames per sec) but also at other frame rates such as 15 frames per sec, 10 frames per sec, etc. Further, by arranging reference signal transmitters of a plurality of different kinds and by selectively using them to effect change-over of the frequency dividing ratio, it is also possible to obtain motion images at a frame rate other than one integer-th of 30 frames per sec.

(2-5) Reproduction of image data on the recording medium by the camera: When the operation part control CPU 4 detects an instruction given by the operator through the operation part 15 for a shift to the mode of reproduction, the signal processing system control CPU 13 notifies the DSP 202 of the instruction for reproduction of images.

(2-5-1) Reproduction of unprocessed images on the recording medium: The same as the function (2-5-1) of the first embodiment described in the foregoing.

(2-5-2) Reproduction of compressed images on the recording medium: If the image file recorded on the recording medium 101 consists of compressed image data, the compressed image data is sent to the buffer memory 205 through the recording medium interface 104, the memory bus controller 102 and the extended interface controller 110. The DSP 202 expands luminance information data included in the compressed image data and, if necessary, performs thinning according to the image size of the display buffer memory 12. After that, the data is transferred to the display buffer memory 12 through the extended interface controller 110 and the memory bus controller 102.

In a case where an index image is added, the data does not have to be expanded and is subjected as it is to the thinning-out process or an interpolation process according to the image size of the display buffer memory 12. After that, the data is transferred to the display buffer memory 12 through the extended interface controller 110 and the memory bus controller 102.

(2-6) Reproduction of sound data on the recording medium by the camera: The same as the function (2-6) of the first embodiment.

(2-7) Transfer of image data on the recording medium to the external bus: The same as the function (2-7) of the first embodiment.

(2-8) Transfer of sound data on the recording medium to the external bus: The same as the function (2-8) of the first embodiment.

(2-9) Transfer of image data of the host computer onto the recording medium: The host computer 112 issues an instruction through the external bus 401 to the camera of this embodiment. Image data is then transferred from the host computer 112 to the camera to be recorded on the recording medium 101. In this instance, the image data transferred from the host computer 112 may be in the form of an unprocessed image, a compressed image or an uncompressed image. The image data thus received is recorded on the recording medium 101 in the form of a compressed image.

In a case where the form of the data is not to be converted, the compressed image data coming through the external interface controller 207 is recorded on the recording medium 101 through the extended interface controller 110, the memory bus controller 102 and the recording medium interface 104.

In a case where the form of data is to be converted, the unprocessed image data coming through the external interface controller 207 is sent to the pickup image signal processing circuit 203 to be converted into luminance and color information in a state of uncompressed image. The output of the pickup image signal processing circuit 203 is sent to the buffer memory 205. The DSP 202 then has access to the buffer memory 205 to form compressed image data. The compressed image data is recorded on the recording medium 101. If the image data received through the external interface controller 207 is uncompressed image data, the image data is compressed before it is recorded on the recording medium 101.

(2-10) Conversion of the form of data of the host computer: The host computer 112 issues, through the external bus 401, an instruction to the camera of this embodiment to convert the form of image or sound data. The image or sound data is then transferred from the host computer 112 to the camera of this embodiment. The form of the data thus received is converted and returned to the host computer 112 through the external bus 401.

The conceivable forms of image data to be transferred from the host computer 112 include an unprocessed image, a compressed image and an uncompressed image. The conceivable forms of image data to be returned include a compressed image and an uncompressed image.

The conceivable forms of sound data to be transferred from and returned to the host computer 112 include compressed sounds and uncompressed sounds.

In a case where the form of the unprocessed image is to be converted, the unprocessed image data coming in through the external interface controller 207 is sent to the pickup image signal processing circuit 203 and is then stored in the buffer memory 205. After that, the uncompressed image data of the buffer memory 205 is returned to the host computer 112 through the external interface controller 207 either as it is or after it is compressed by the DSP 202.

In converting the form of a compressed image, the compressed image data coming in through the external interface controller 207 is transferred directly to the buffer memory 205. After the transfer, the data of the buffer memory 205 is expanded by the DSP 202 before it is returned to the host computer 112 through the external interface controller 207.

In converting the form of an uncompressed image, the uncompressed image data coming in through the external interface controller 207 is transferred directly to the buffer memory 205. After the transfer, the data of the buffer memory 205 is compressed by the DSP 202 before it is returned to the host computer 112 through the external interface controller 207.

In converting the form of sounds, the DSP 202 receives sound data through the external interface controller 207 and transfers it to the buffer memory 205. After an amount of the sound data corresponding to the capacity of the buffer memory 205 has been transferred, the form of the data of the buffer memory 205 is converted. With its form thus converted, the data is returned to the host computer 112 through the external interface controller 207. This process is repeated until all the sound data on the host computer 112 have been completely processed.

With the extended card employed, this function enables the host computer 112 which has a low signal processing capability to process signals at a high speed.

Third Embodiment

Figure 5:
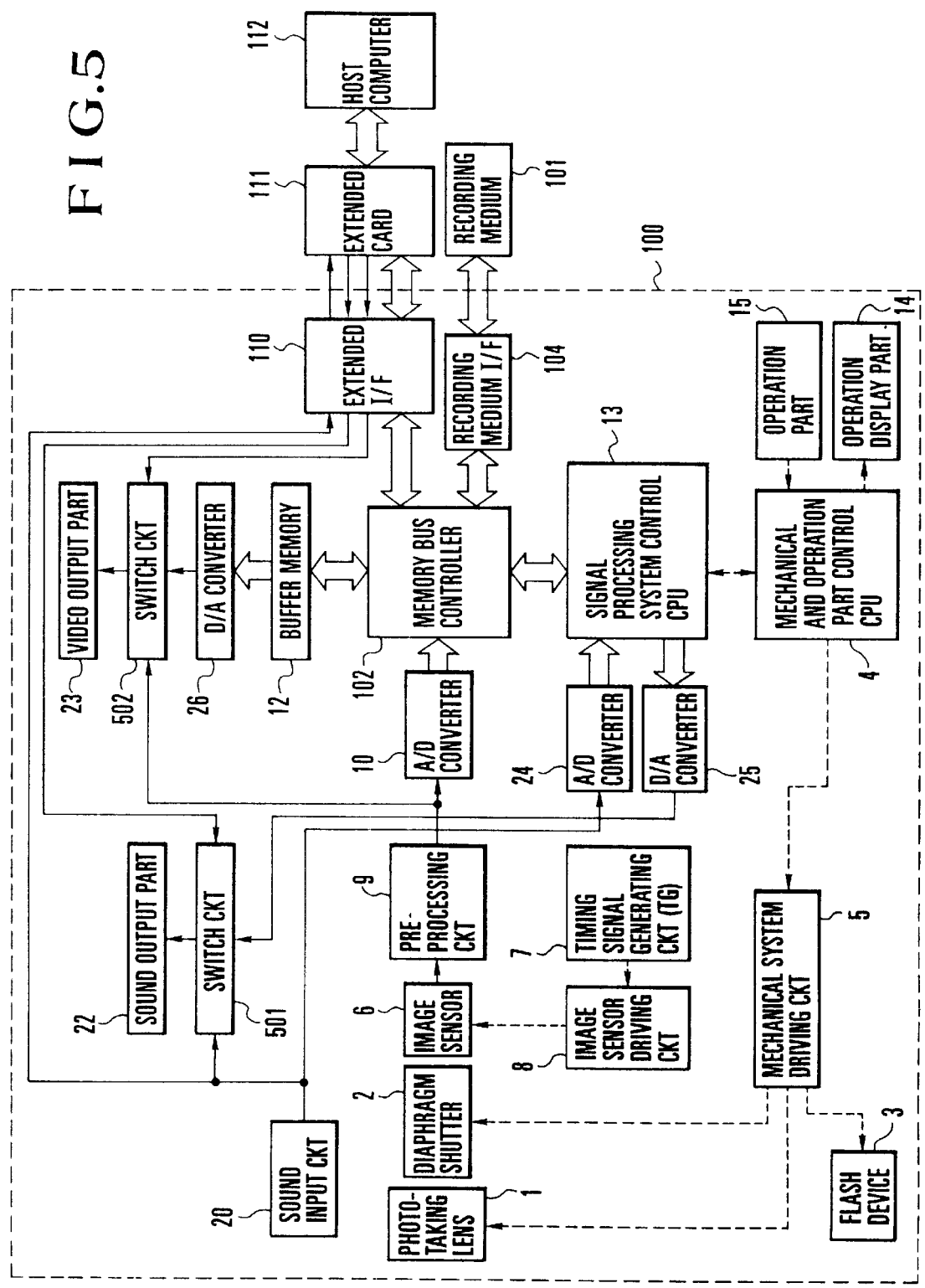
FIG. 5 is a block diagram showing the arrangement of a third embodiment of this invention.
Figure 6:
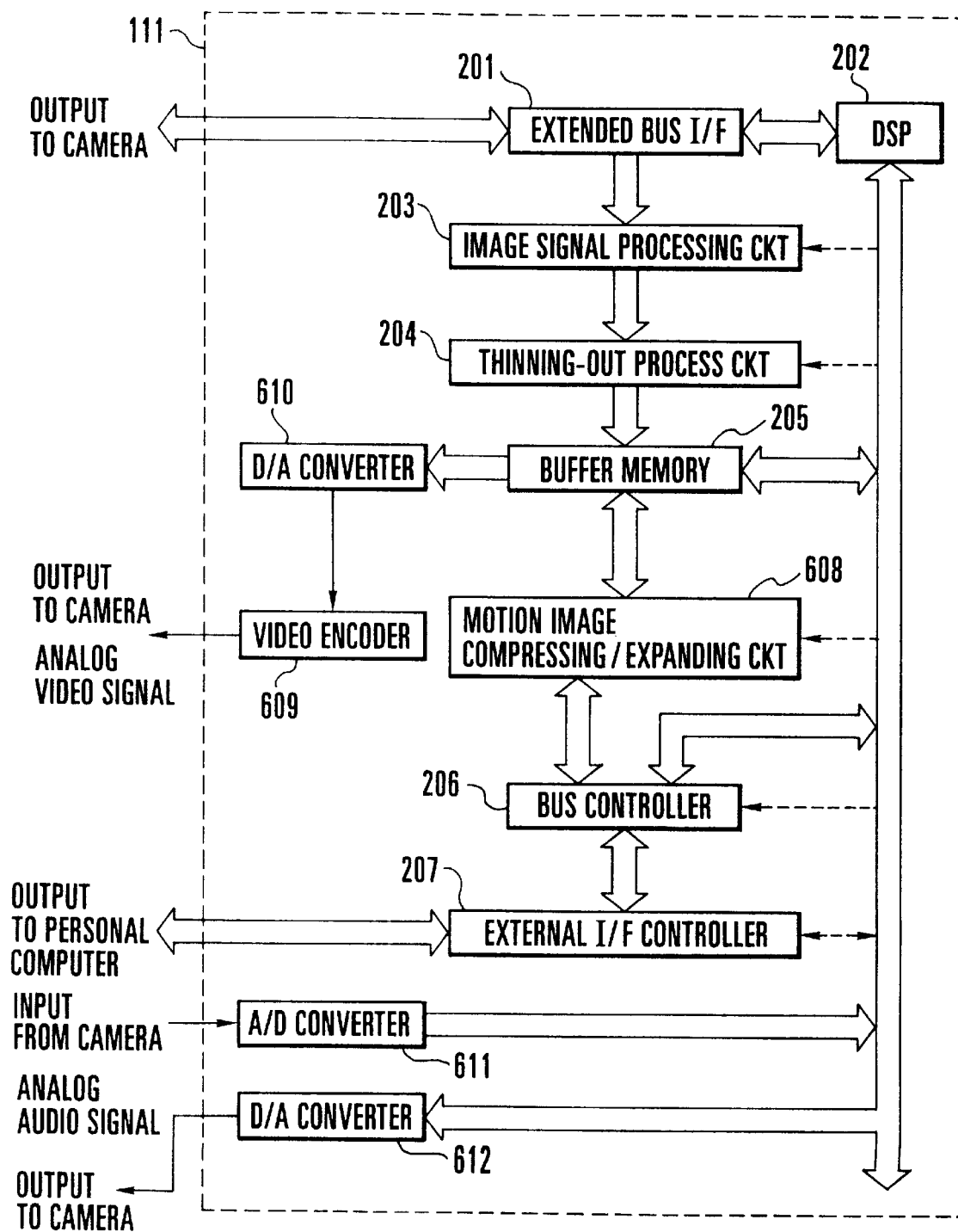
FIG. 6 is a block diagram showing an extended card included in the third embodiment of this invention.

FIGS. 5 and 6 show a camera system arranged according to this invention as a third embodiment thereof.

Referring to FIGS. 5 and 6, an audio signal obtained from a sound input circuit 20 is arranged to be supplied to an A/D converter 611 of an extended card 111 through an extended bus interface. The A/D converter 611 and a D/A converter 612 are arranged to have a higher accuracy and a wider bit width than an A/D converter 24 and a D/A converter 25. A signal processing DSP 202 is thus enabled to handle sound data of a high quality.

A signal processing system control CPU 13 is arranged to control a switch circuit 501 to select the output signal of the D/A converter 612, so that a high quality sound can be outputted with the DSP 202 supplying the high quality sound data to the D/A converter 612.

When the extended card is mounted, as described in the paragraph (2) in the foregoing description of the first embodiment, the third embodiment can record and reproduce high quality sounds with the audio signal processed by the signal processing DSP 202 instead of by the signal processing system control CPU 13. In this instance, sound data of a large bit number is of course either compressed before filing or filed as it is. Further, in a case where sound data of a small bit width and recorded singly by the camera is to be reproduced by using the extended card, the sound data can be reproduced with little distortion by widening the bit width and by carrying out an oversampling filter process.

In FIG. 6 which shows the arrangement of the extended card 111, a motion image compressing/expanding circuit 608 is a compressing/expanding circuit arranged to to compress, in real time, uncompressed image data which has been processed by a pickup image signal processing circuit 203 and stored in the buffer memory 205. While the DSP of the first embodiment is arranged to carry out the image compressing or expanding process by software, the third embodiment is arranged to have the image compressing or expanding process carried out in real time by the motion image compressing/expanding circuit 608. Therefore, the compressing/expanding process can be carried out much faster than in the case of the first embodiment. A particularly salient advantage resides in that, since the compressed data can be outputted in real time to an external interface controller 207, the data of motion images can be transferred even with the transfer speed of the external interface allowed to be much slower. Further, since compressed data can be expanded by receiving it directly from the external interface without passing it through the signal processing DSP 202, the expanding process can be carried out at a high speed.

The signal processing DSP 202 can receive via a bus controller 206 the data compressed by the motion image compressing/expanding circuit 608 and transmit it to a recording medium 101. In a case where compressed data recorded on the recording medium 101 is to be expanded, the signal processing DSP 202 transfers the compressed data via the bus controller 206 to the motion image compressing/expanding circuit 608 to have it expanded and stored in the buffer memory 205. The signal processing DSP 202 thus can read out the expanded, uncompressed data from the buffer memory 205. Referring to FIG. 6, the output of the buffer memory 205 is connected to the D/A converter 610 and to the switch circuit 501 through a video encoder 609 and the extended bus interface.

A signal processing system control CPU 13 is arranged to be capable of causing the image stored in the buffer memory 205 to be displayed by controlling the switch circuit 502 in such a way as to select the output signal of the D/A converter 610. A memory having a small number of picture elements is employed as an image display buffer memory 12 for the purpose of displaying an image in a simple state. However, the buffer memory 205 is on the other hand arranged to be capable of displaying an image consisting of the same number of picture elements as an image sensor 6. The display capability thus can be greatly enhanced with the extended card 111 mounted on the camera body 100. Therefore, in a case where a plurality of images are to be reproduced and displayed, the third embodiment is capable of enabling the operator to see more images than in the case of the first embodiment.

Further, a display of a simple image can be made at a video output part 23 with the switch circuit 502 controlled in such a way as to select the output signal of a preprocessing circuit 9. In this case, electric energy can be saved by stopping the supply of power to a part including the A/D converter 10, the memory bus controller 102, the buffer memory 12 and a D/A converter 26.

The parts of the third embodiment arranged to have a stronger functions than those of the first embodiment, such as the sound A/D and D/A converters having a wider bit width, the compression circuit having the motion image compressing function, the video encoder of the buffer memory, of course do not have to be actually included all at once in the system but they can be individually installed as desired.

Fourth Embodiment

Figure 7:
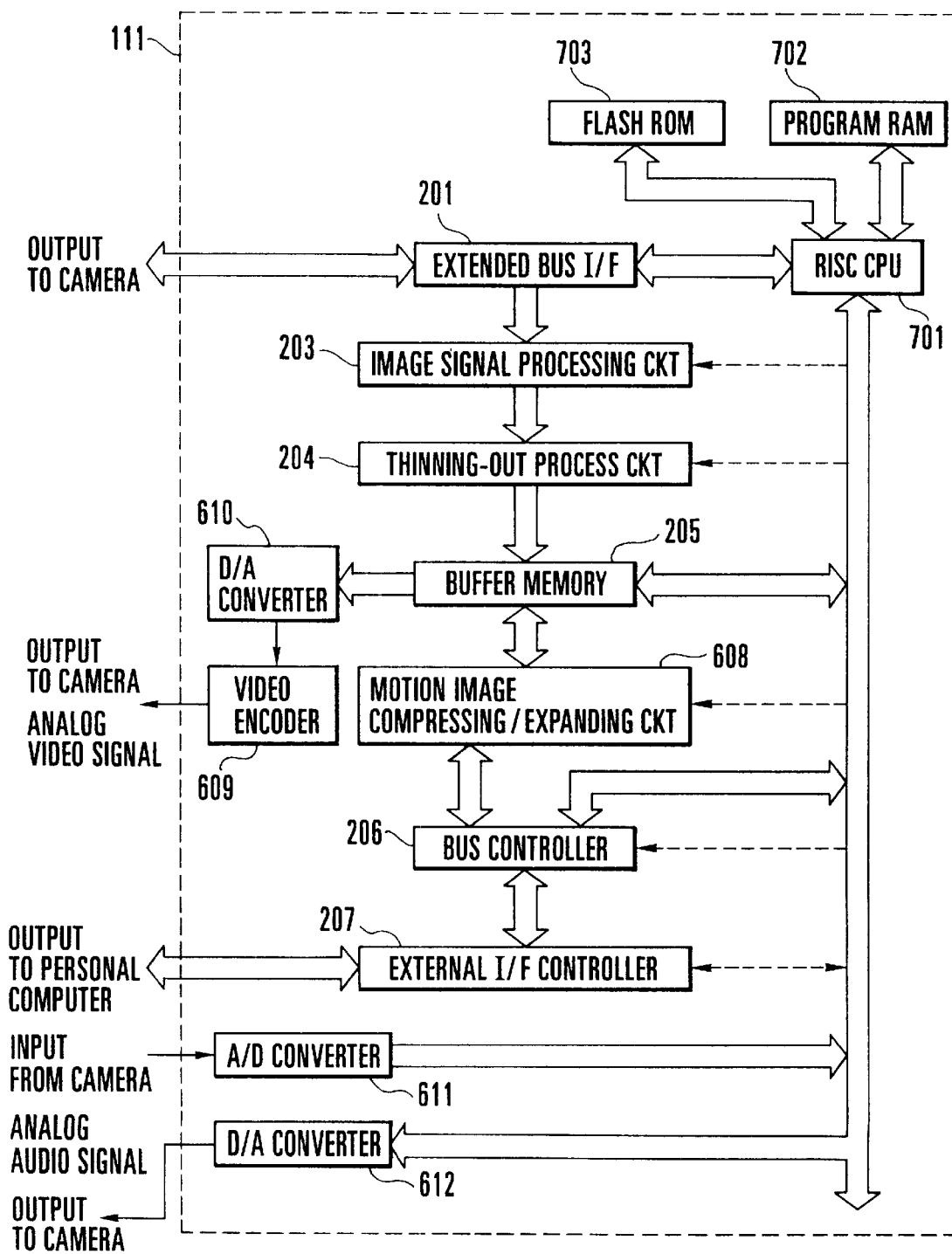
FIG. 7 is a block diagram showing an extended card included in a fourth embodiment of this invention.

FIG. 7 is a block diagram showing by way of example the arrangement of an extended card employed in a fourth embodiment of this invention. In FIG. 7, reference numerals 111 to 612 denotes blocks which are identical with those of FIG. 6. Reference numeral 701 denotes a reduced instruction set computer (RISC) CPU. A program RAM 702 is arranged to store an operation program of the RISC CPU 701. A flash ROM 703 is arranged to store the basic input and output system (BIOS) of the RISC CPU 701. The operation of the fourth embodiment is described with reference to FIGS. 5 and 7 as follows:

In the case of the fourth embodiment, a recording medium 101 in which a program of the BIOS level of the RISC CPU 701 is written is first mounted on the camera part 100 of FIG. 5. The contents of the recording medium 101 are transferred to the extended card 111 through a recording medium interface 104 and an extended interface 110 under the control of a memory bus controller 102. At the extended card 111, the RISC CPU 701 controls the program data transferred from the camera part 100 to be written into the flash ROM 703 through the extended bus interface. This action makes it possible to have the functions and the performance of the digital electronic camera at its BIOS level to be variable with the extended card 111 mounted on the camera part 100. The camera can be improved to a great extent by this without replacing the whole camera part. Next, a medium in which an application program to be run on the RISC CPU 701 is written is mounted as the recording medium 101. This application software (program) is likewise written into the program RAM 702 of the extended card 111 through the extended bus. By doing this, it becomes possible to have application software of varied kinds selectively run on the digital electronic camera. In other words, with the extended card mounted, video and audio signals transferred from the camera part 100 can be processed not only in the same manner as in the case of the third embodiment but also in a more highly sophisticated manner according to the contents of the programs written in the program RAM 702 and the flash ROM 703.

For example, by writing a character recognition program in the program RAM 702, a character image which is picked up by the camera can be processed by the RISC CPU 701 to convert it into text data to have it stored in a program RAM, including programs related to the software of translation, image recognition, image synthesis, etc.

While the fourth embodiment has been described as having the recording medium 101 connected to the camera as a supply source of a processing program or a BIOS, the processing program may be supplied from some other information apparatus such as a personal computer through the SCSI bus of the extended card.

The fourth embodiment is arranged as described above to use the RISC CPU as a processor which permits a high speed computing operation. However, the RISC CPU of course may be replaced with some other processor, such as a CISC (complex instruction set computer) CPU or the like.

While this invention has been described in detail through some preferred embodiments thereof, this invention is not limited to the embodiments described. Various changes and modifications of these embodiments of course may be made without departing from the spirit and scope of the invention.

The main features of this invention are briefly described as follows:

The invention provides a low-priced recording and/or reproducing system when nothing is connected to the extended interface of the system.

Further, while such units that require a large investment and much labor in developing them, such as the optical and image pickup parts, are left to be employed in common, the invention provides a system most apposite to the desire of the users by varying the functions of the units to be inserted into the extended interface. Therefore, a system which is not expensive as a whole can be obtained in accordance with this invention.

What is claimed is:

1. A recording and/or reproducing apparatus comprising:
   a) an optical system arranged to form an optical image;
   b) photo-electric conversion means for converting the optical image formed by said optical system into an electrical signal;
   c) A/D conversion means for converting the electrical signal into a digital signal;
   d) recording and/or reproducing card unit arranged for mounting and demounting directly on or from said recording and/or reproducing apparatus through a signal interface and including a recording medium on which the digital signal obtained from said A/D conversion means is to be recorded and reproduced; and
   e) signal processing card unit having a program memory, a CPU and a BIOS memory for processing said digital signal to generate image signals, wherein said signal processing card unit being arranged to be directly mountable and demountable on and from said recording and/or reproducing apparatus and having a signal interface for controlling an operation of said program memory in accordance with a command of an external control apparatus.

2. An apparatus according to claim 1, wherein said recording medium includes a semiconductor memory.

3. An apparatus according to claim 1, wherein said signal processing card unit includes first communication means for communication with an external computer.

4. An apparatus according to claim 3, wherein said signal processing card unit further includes second communication means for communication with a computer disposed within said recording and/or reproducing apparatus.

5. An apparatus according to claim 1, wherein said signal processing card unit includes compressing means for compressing an input digital signal.

6. An apparatus according to claim 4, wherein said first and second communication means is so arranged that said external computer can control an operation of said photoelectrical conversion means through said first and second communication means.

7. An apparatus according to claim 1, wherein said signal processing unit is arranged in conformity with the specifications of the PCMCIA (Personal Computer Memory Card Internal Association).

8. A recording and/or reproducing apparatus comprising:
   a) conversion means for generating an electrical output signal indicative of an object image;
   b) card memory for direct mounting on and demounting from said recording and/or reproducing apparatus; and
   c) extended card having a program memory, a CPU, and a BIOS memory for direct mounting on and demounting from said recording and/or reproducing apparatus and having a signal interface for controlling an operation of said program memory according to a control signal from an external computer.

9. An apparatus according to claim 8, wherein said expansion card is arranged in conformity with the specifications of the PCMCIA (Personal Computer Memory Card Internal Association).

10. An apparatus according to claim 8, wherein said card memory memorizes an image signal.

11. An apparatus according to claim 8, wherein said card memory memorizes a program.

12. An apparatus according to claim 11, wherein said card memory has means for transferring the program in the card memory to the extended card.

13. An apparatus according to claim 8, wherein the extended card processes picked-up image signal on the basis of the program in the program memory.

14. A recording and/or reproducing apparatus comprising:
   a) conversion means for generating an electrical output signal indicative of an object image; and
   b) extended card having a program memory, a CPU, and a BIOS memory for direct mounting on and demounting from said recording and/or reproducing apparatus and having a signal interface for controlling an operation of said program memory according to a control signal from an external computer, said extended card further having means for controlling an operation of the conversion means.

15. An apparatus according to claim 14, wherein a card memory different from the extended card is attachable.

16. An apparatus according to claim 15, wherein said card memory memorizes an image signal.

17. An apparatus according to claim 16, wherein said card memory has means for transferring the program in the card memory to the extended card.

18. An apparatus according to claim 14, wherein the extended card processes picked-up image signal on the basis of the program in the program memory.

* * * * *

UNITED STATES PATENT AND TRADEMARK OFFICE
CERTIFICATE OF CORRECTION

PATENT NO.    : 6,229,954 B1
DATED         : May 8, 2001
INVENTOR(S)   : Taku Yamagami; Masao Suzuki; Yuji Sakaegi It is certified that error appears in the above-identified patent and that said Letters Patent is hereby corrected as shown below:

<u>Column 5,</u>
Line 4, delete "output-part" and insert -- output part --.

Signed and Sealed this

Twenty-sixth Day of March, 2002

JAMES E. ROGAN
*Director of the United States Patent and Trademark Office*

*Attest:*

*Attesting Officer*